United States Patent [19]

Antosh

[11] Patent Number: 4,958,575

[45] Date of Patent: Sep. 25, 1990

[54] TRANSIT VEHICLE APPARATUS AND METHOD FOR SOLAR INDUCTION MONORAILS

[76] Inventor: Mark J. Antosh, 4009 N. Stone Ave., Tucson, Ariz. 85705

[21] Appl. No.: 447,196

[22] Filed: Dec. 7, 1989

Related U.S. Application Data

[62] Division of Ser. No. 174,422, Mar. 28, 1988, Pat. No. 4,885,995.

[51] Int. Cl.$^5$ .......................... B60L 8/00; B60L 13/10
[52] U.S. Cl. .................................... 104/288; 104/118; 104/281; 180/2.2
[58] Field of Search ............... 104/118, 281, 282, 288; 105/50; 180/2.1.2.2

[56] References Cited

U.S. PATENT DOCUMENTS

| | | | |
|---|---|---|---|
| 2,923,254 | 2/1960 | Barthelemess | 104/118 |
| 2,985,114 | 5/1961 | Lindner | 105/141 |
| 4,274,336 | 6/1981 | Pater et al. | 104/124 |
| 4,313,383 | 2/1982 | Parazader | 104/124 |
| 4,375,193 | 3/1983 | Sullivan | 104/118 |
| 4,690,064 | 9/1987 | Owen | 104/119 |
| 4,781,119 | 11/1988 | Davis | 104/288 |

Primary Examiner—Joseph F. Peters, Jr.
Assistant Examiner—Virna Lissi Mojica
Attorney, Agent, or Firm—Victor Flores

[57] ABSTRACT

A transportation system including a solar energy collecting monorail structure formed with a photovoltaic surface layer having a solar energy converting means for converting the collected solar energy to electrical energy. A power distribution means for distributing stored energy to transit vehicles being propelled along the monorail structure or distributing excess energy to a remote power utility source. The monorail structure includes means for propelling a transit vehicle according to magnetic principals associated with transverse flux motors. The system also includes a computer controlled, elevation compensating monorail structure extrusion machine comprising a fabrication chamber which continuously fabricates the monorail structure along a monorail construction right-of-way.

5 Claims, 6 Drawing Sheets

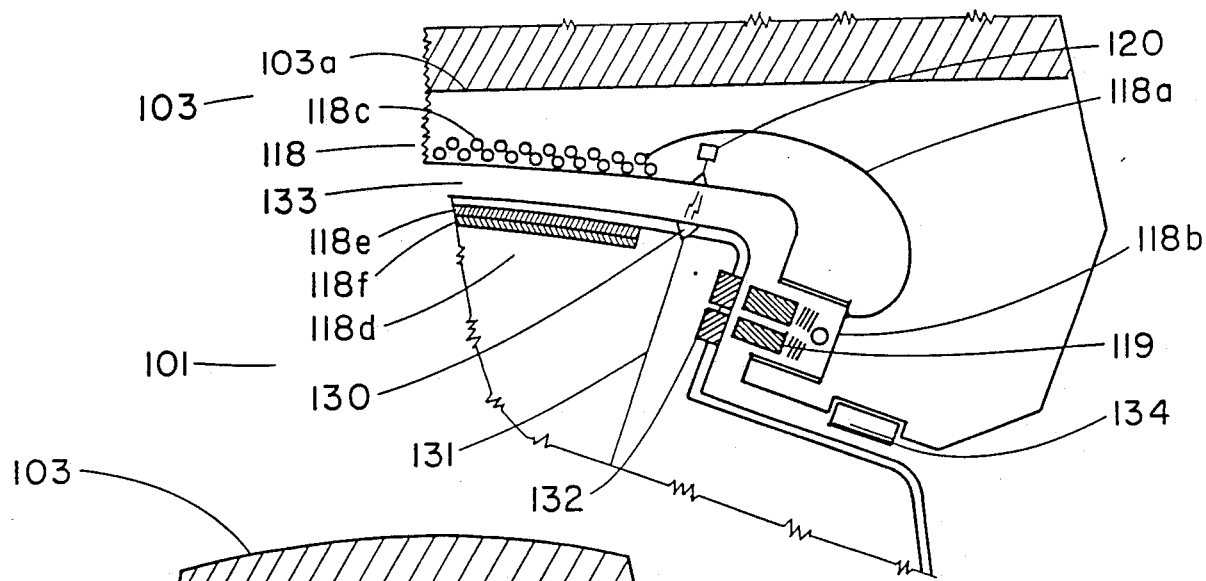
Fig.3a
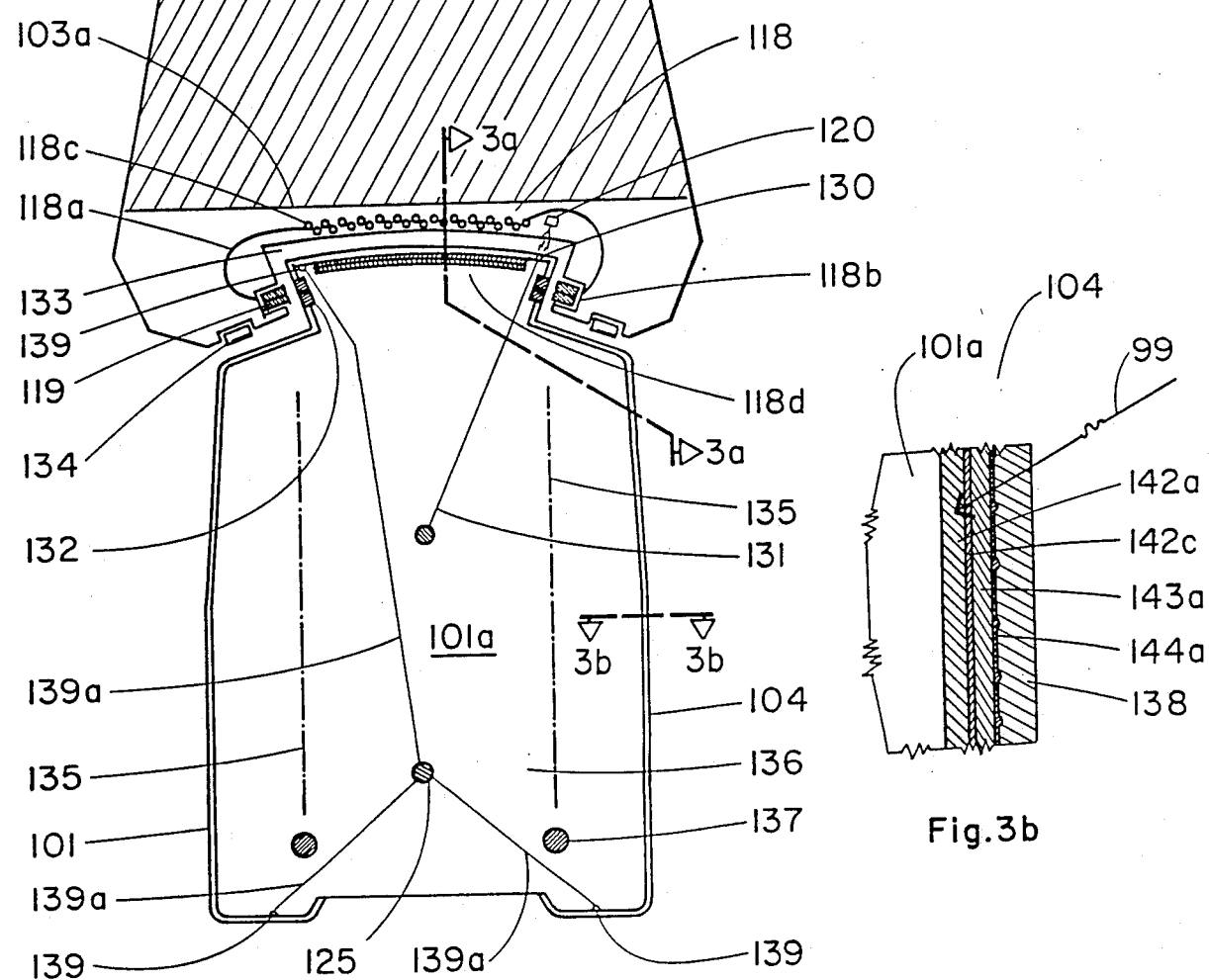
Fig.3b
Fig.3

TRANSIT VEHICLE APPARATUS AND METHOD FOR SOLAR INDUCTION MONORAILS

This is a divisional of application Ser. No. 07/174,422 filed Mar. 28, 1988 now U.S. Pat. No. 4,885,995 with issue date of Dec. 12, 1989.

FIELD OF THE INVENTION

The present invention relates generally to solar induction monorails and more particularly, is concerned with a system and method for the construction of a solar induction monorail system having solar power conversion, distribution and power sharing capability.

DESCRIPTION OF THE PRIOR ART

It is known to provide monorail structures for elevated monorail trains. Most known monorail structures consist of fabricated cast concrete or rolled steel sections supported by columns and improvements thereon. There are no known monorails that are constructed having a photovoltaic skin or surface for collecting solar energy and converting the energy for utilization by the transportation means using the monorail. The prior art teaching the structure of monorails systems is described in the following U.S. patents.

U.S. Pat. No. 4,690,064 to W. E. Owen teaches a side-mounted monorail transportation system provided with a support beam from which vehicles are supported in a pendulum-like manner. The support beam is supported on columns both of which are constructed of steel rebar-reinforced concrete. The power source is dc electric power which is presumably supplied to the vehicle through conductors secured to the support beam. The means of propulsion discussed are rotating electric motors, linear induction motors, hydraulic motors, steam engines, internal combustion engines, jet engines, rocket engines, nuclear power engines or combinations thereof.

U.S. Pat. No. 4,313,38 to S. Parazadar teaches a guideway unit, which is an elevated structure on which rapid transit cars can run. The guideway unit teaches supporting a railway system of the type employing steel running rails, a central support for a linear induction motor assembly and a power collector rail mounted on removable side panels.

U.S. Pat. No. 2,923,254 to H. Barthelmess teaches a transition curve track section for connecting a monotrack railway system. The monobeam of the patent is preferably formed of poured concrete and reinforced in accordance with conventional practice.

U.S. Pat. No. 2,985,114 to B. M. Lindner teaches an improved low friction truck for mono beam supported and guided vehicles.

U.S. Pat. No. 4,274,336 to pater et al. teaches a monorail guideway structure wherein of interest is the teaching of selectively reinforcing the structure "on site". The guideway structure of this patent does not teach an extruded rail of the present invention.

U.S. Pat. No. 4,375,193 to D. P. Sullivan teaches an improved guideway assembly wherein of interest is the teaching of "on site" reinforcement of the structure. The guideway structure improvements go towards solving weather related problem which result in decreasing reliability.

The prior art assumes the availability of electric energy from a utility company and teaches the construction of a monorail structure designed in accordance with providing the appropriate interface between the electrical source and the monorail structure to the point of utilization by a vehicle on the monorail. In today's energy shortage prone environment, alternate energy sources must be considered in designing systems that have a high demand of utilization. Solar energy conversion technologies have not reaches their full utilization potential, especially in the field of monorail transportation systems. The prior art, as evident by the above prior art patents, does not teach a monorail structure and method for utilizing the surface of a monorail structure for collecting solar energy and converting the solar energy into electrical energy for utilization by a monorail vehicle. The monorail structures of the prior art are constructed according to methods which use machinery known in the fabrication of reinforced concrete structures. The fabrication machine for a solar collector monorail structure is not taught by the prior art. Thus, a need is felt to exist for continued emphasis on the utilization of solar energy as an alternative energy source, especially in the development of monorail transportation systems, which type of transportation systems are foreseen to be a primary means of public transportation in the near future. A need is also seen for a monorail structure that take advantage of the enormous amount of surface area of the monorail and uses the surface of the structure as a solar collector and converts the collected solar energy into electrical energy for use by a vehicle designed for propulsion using the converted electrical energy. A need is further seen to exist for a fabrication machine which will produce, on-site, a solar collecting monorail. Still a need is seen to exist for a solar collecting monorail system having an energy source switching means, which means contemplates the sun as a primary source for the electrical energy and a power utility as an alternate source. Thus, a primary object of the present invention is to provide a monorail structure which collects energy from the sun and within the structure converts and stores the collected energy into electrical energy for use by a mono-railed vehicle. A second object of the present invention is to provide a fabricating machine which can produce the solar collecting monorail structure on-site according to survey information, material specification and other pertinent structural data and building code requirements. A related object with the primary object is to provide a solar collecting monorail structure which can also be powered from a utility power source and which can also provide excess electrical power to the utility power source.

SUMMARY OF THE INVENTION

The present invention provides a system and method for the construction of a solar induction monorail system designed to satisfy the aforementioned needs. The system consists of a solar energy collecting means comprising a monorail structure formed with a photovoltaic surface layer having a solar energy converting means for converting the collected solar energy to electrical energy, an electrical energy storage means for storing the converted electrical energy, an electrical energy management interface means for controlling the input and output power demand on the system from the transit vehicle being propelled, the solar collecting monorail energy source or from a power utility source, a power distribution means for distributing stored energy to transit vehicles being propelled along the monorail structure and a magnetic induction means on the monorail structure for propelling a transit vehicle according to magnetic principals associated with transverse flux motors (tfm).

The system is further comprised of a computer controlled monorail structure extrusion means comprising a fabrication chamber which continuously fabricates, in an extruded manner, the monorail structure having a material receiving chamber section, a monorail core assembly chamber section, a monorail body assembly section, a solar collector skin application chamber section and monorail finishing and column mounting chamber section. The monorail structure extrusion means also having a computer controlled elevation compensating track means for following terrain in the right-of-way.

The method consists of providing a computer controlled monorail structure extrusion system, fabricating a solar induction monorail structure, interconnecting a power distribution network within the monorail structure, interconnecting the solar induction monorail structure to a back-up energy supplying source, such as electric power utility source, and propelling monorail vehicles on the monorail structure.

Therefore, to the accomplishments of the foregoing, the invention consists of the foregoing features hereinafter fully described and particularly pointed out in the claims, the accompanying drawings and following disclosure describing in detail the invention, such drawings and disclosure illustrating, however, but one of the various ways in which the invention may be practiced.

BRIEF DESCRIPTION OF THE DRAWINGS

FIG. 3 is a typical cross section of the monorail and a monorail vehicle taken along the line 3—3 in FIG. 2 showing the solar collector conversion interconnections, magnetic induction means and a transit vehicle having transverse flux motor levitation and propulsion components.

FIG. 3a shows an exploded fragmentary view taken along the line 3a—3a in FIG. 3 showing the details of the interface between the monorail and the magnetic induction means within the transit vehicle.

FIG. 3b shows an enlarged sectional view taken along the line 3b—3b in FIG. 3 showing the solar collector composition applied on the inner core portion of the monorail structure.

DESCRIPTION OF THE PREFERRED EMBODIMENT

Figure 1:
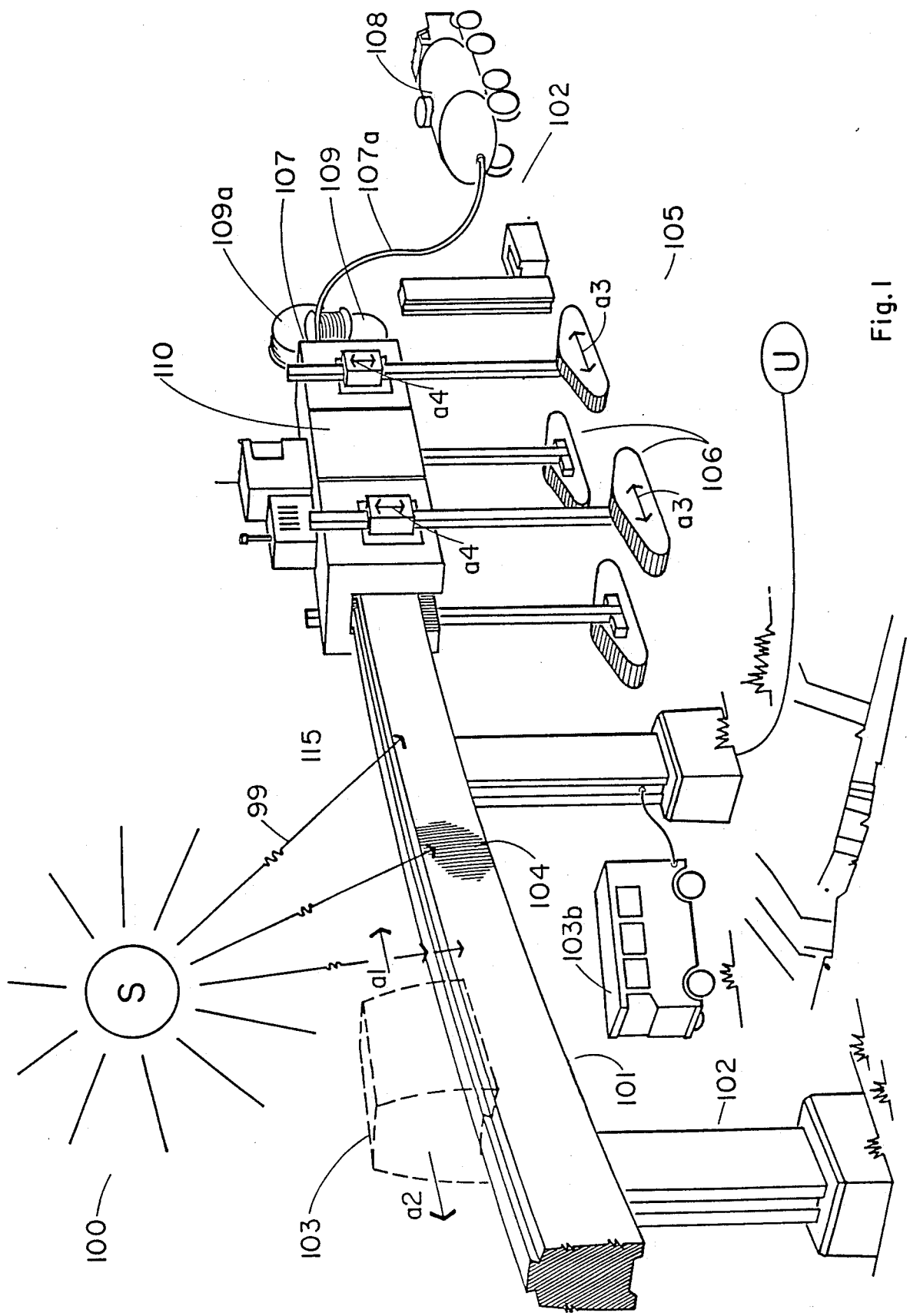
FIG. 1 is a partial perspective view of the system of the present invention showing generally a completed portion of a monorail structure collecting solar energy, a transit vehicle being propelled along the monorail, a ground support vehicle being charged from the system, a power utility source supplying supplemental power, a monorail structure fabrication means, and material being delivered into the fabrication means.

Referring now to the drawings, and more particularly to FIG. 1, where is shown a solar energy dependent monorail system, generally designated 100. The monorail system 100 is comprised of a monorail structure 101 and a mobile structure fabricator means 105. In use, monorail transit vehicle 103 is bi-directionally propelled along monorail structure 101 in the directions of arrows a1 and a2. The preferred embodiment of the invention is directed at designing a monorail system that will enable propelling a transit vehicle using the principles of transverse flux motors (tfm). For further information regarding "transverse flux motors" see an article entitled: "Three-dimensional Engineering", in *Transportation Without Wheels*, edited by E. R. Laithwaite, Westview Press, Boulder, Co., 1977. The tfm principles enable a transit vehicle to incorporate means of suspension and guidance. The monorail system of the present invention will complete the magnetic interface required between the transit vehicle and the monorail structure by providing a magnetic energy source which is derived within the monorail structure using photovoltaic conversion of energy from the sun. Thus, in the preferred embodiment, monorail structure 101 is designed having a solar collector 104 receiving sunlight 99 from sun S and using photovoltaic energy conversion principles, electrical energy is produced within the entire structure of the monorail and is distributed to storage means 127, see FIG. 2, in a plurality of support columns 102 throughout the system 100 for use by transit vehicle 103 upon demand. As an added feature, the system as an alternative energy source such as an electric power utility, generally designated U, which feeds the system via support columns 102. The system 100 is also designed to feed any excess energy into the power utility U and also provides an electrical charging means for charging a ground support vehicle 103b.

Still referring to FIG. 1, monorail structure 101 is shown being extruded from mobile monorail structure fabricator means 105, at a monorail fabrication exit end 115. The mobile monorail structure fabricator means 105 includes a fabrication chamber 110, an elevation compensating track driven assembly 106, and a material entry end 107. The elevation compensating capability of the mobile fabricator melans is shown by directional arrows a4 while forward motion is depicted by directional arrows a3. The material used to fabricate the monorail structure may be delivered to fabricator means 105 in a liquid form and supplied using an entry supply hose 107a delivered by material carrier 108. Other material which is required for completing the monorail construction includes unassembled columns 102, electrical conduit material 109 and sheet material spool 109a, which is shown ready for use at entry end 107 or beneath fabricator means 105 as the mobile fabricator means 105 advances along the construction right-of-way.

Figure 2:
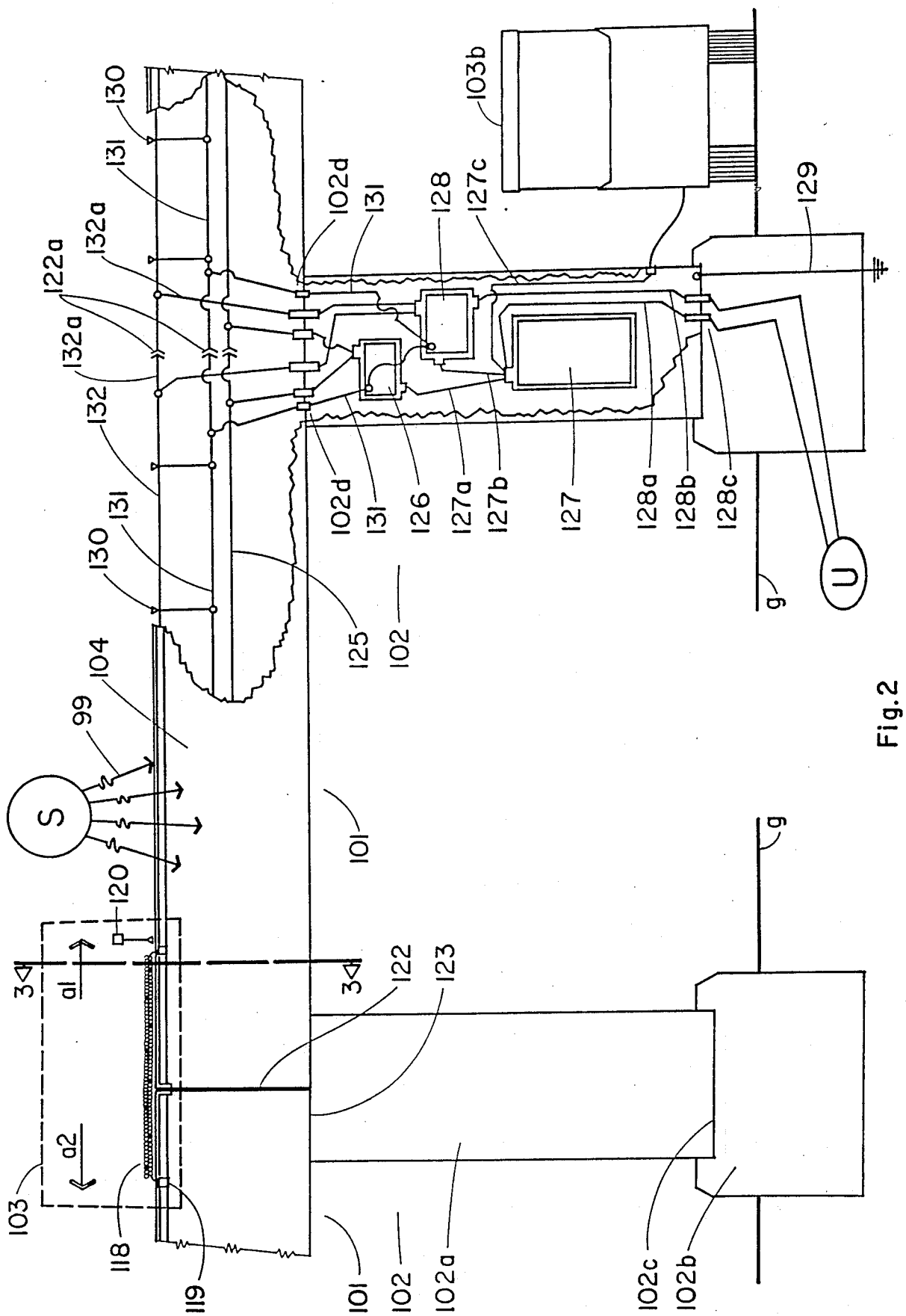
FIG. 2 is a partial longitudinal fragmented view of the monorail structure showing the support columns, a partial diagrammatic representation of the distribution network internal and external to the monorail structure.

Referring now to FIG. 2, where is shown a partial longitudinal fragmented view of the monorail structure 101 being supported on support columns 102 and solar collector 104 absorbing sunlight 99 from sun S. Shown also is a cutaway portion of monorail structure 101 and column 102 showing a partial diagrammatic representation of the energy distribution and communication network internal and external. In the assembly of column 102, post 102a is fixedly attached to post footing 102b at post-footing joint 102c. Post footing 102b is typically a poured concrete structure and is located above and below ground level g. Monorail structure 101 is preferably constructed in sequential segments joined to the top portion of posts 102a at a post-monorail joint 123, while sequential monorail structure segments are joined at a monorail-monorail expansion joint 122. A more detailed description of column 102 will follow in describing FIG. 10.

Also shown in FIG. 2 is transit vehicle 103 capable of being propelled by transverse flux motor (tfm) 118 in either direction, shown by arrows a1 and a2. In use, transit vehicle 103 communicates energy demand requests from storage means 127 via optical control means 120 which is optically coupled to energy controller 128 by a plurality of optical sensors 130 and fiber optics conductors 131.

Referring now to FIG. 3b, showing the composition of solar collector 104. In actual operation, solar collector 104 converts the incident sunlight 99 to electrical energy according to photovoltaic principles by penetrating the outer protective barrier 138 and is absorbed by layered, electrical energy producing, light sensitive, silicon materials comprised of vacuum deposited inner p-layer material 142a, typically, hydrogenated silicon doped with phosphorous, an intrinsic layer 142c, typically undoped hydrogenated silicon, and an outer n-layer 143a, typically hydrogenated silicon doped with boron. The solar energy thus converted to electrical energy is gathered by a metallic grid conductor material 144a, which is applied in an emulsion form. Referring now to FIG. 2, the electrical energy created is then distributed by input power conductors 125 from photovoltaic transfer point 139 via power lead 139a (see FIG. 3) to storage battery 127 via a battery charger 126 and input cable lead 127a. Upon demand, power is withdrawn from storage battery 127 through output cable 127b to monorail control unit and switch means 128 or to utility power U through output cable 128a, if there is an excess amount of power stored in battery 127. Monorail control unit 128 can not only receive power from storage battery 127 through cable 127b but also from power utility U through input cable 128b in the event that solar collector 104 is unable to produce electrical energy due to cloudy conditions or for other reasons making the sysltem non-functional. From monorail control unit 128, power is distributed to the transit vehicle 103 via power conductors 132a, 132 and brushes 119. Between segments of monorail structure 101 there is provided column-monorail electrical and optical connector means 102d and monorail-monorail electrical and optical connector means 122a for allowing independent operation of individual monorail segments. Similarly, electrical connectors 128c are provided between post 102a and post footing 102b. Also shown in FIG. 2 is a grounding means 129 provided for safety purposes. The system is also provided with an electrical outlet 127c for charging a ground support vehicle 103b.

Referring now to FIGS. 3 and 3a showing a typical cross section of monorail 101 and transit vehicle 103. Transit vehicle 103, having a floor 103a, is provided with a transverse flux linear induction motor 118 (hereinafter tfm 118) which is comprised of a primary 118c and secondary 118d and an air gap portion 133. The primary 118c receives power through primary wiring 118a from brushes 119 housed in enclosure 118b in contact with power conductor 132. The secondary 118d of tfm 118 is magnetically coupled through air gap 133 and includes aluminum reaction sheet 118e bonded to steel sheet 118f. Also shown is the optical control means 120 in transit vehicle 103 which is optically coupled to energy controller 128 by a plurality of optical sensors 120 and fiber optics conductors 131. Since transit vehicle 103 is magnetically levitated by tfm 118, incidental contact with monorail 101 is eased by low friction skid rollers 134. Also, due to the magnetic levitation, directional monorail guidance is maintained by the substantially omega-shaped bottom portion of floor 103a which is magnetically coupled to monorail 101.

Referring to FIGS. 3 and 3b, monorail 101 is shown comprised of solar collector 104 applied onto an inner core 101a. Inner core 101a is shown provided with longitudinal rail reinforcement 135 and longitudinal tensioning cable 137. Solar collector 104 is comprised of an outer protective barrier 138 and layered, electrical energy producing, light sensitive, silicon materials comprised of vacuum deposited inner p-layer material 142a, typically, hydrogenated silicon doped with phosphorous, an intrinsic layer 142c, typically undoped hydrogenated silicon, and an outer n-layer 143a, typically hydrogenated silicon doped with boron. Solar collector 104 is further comprised of a metallic grid conductor material 144a, which is applied in an emulsion form and used for gathering the converted electrical energy. The electrical energy gathered by grid conductor 144a is then distributed from photovoltaic transfer point 139 via power leads 139a and input power conductors 125 to storage battery 127.

Figures 4, 5:
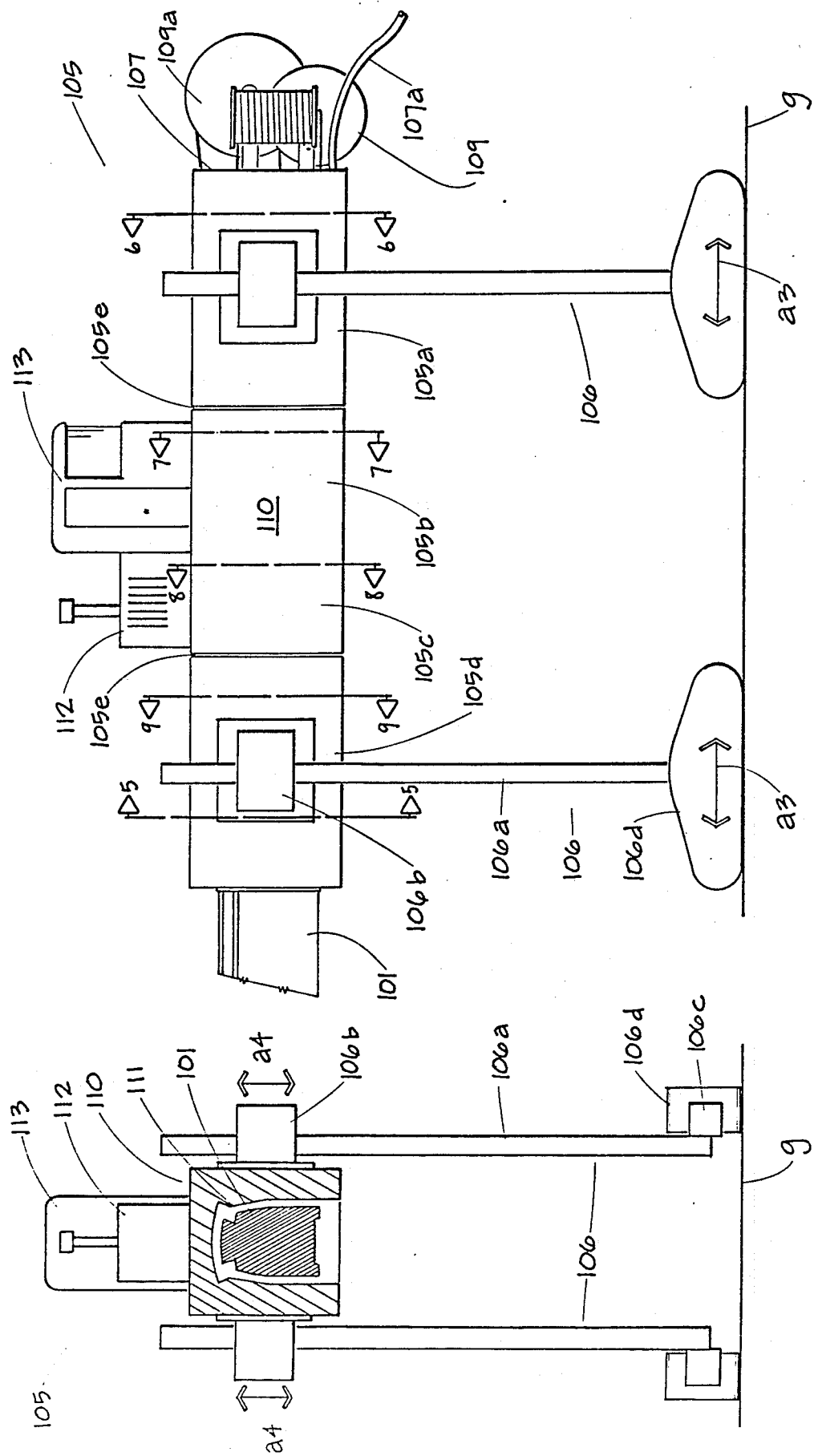
FIG. 4 is a longitudinal view of the mobile monorail structure fabricator means showing the fabrication chambers and elevation compensating track driven system.
FIG. 5 is a cross-sectional view of the mobile monorail structure fabricator means taken along the line 5—5 of FIG. 4 showing a partially completed monorail structure being extruded and ready for mounting on supporting column and further showing the elevation compensating capability of the track driven system.

Referring now to FIGS. 4 and 5 showing mobile monorail structure fabricatior means 105, having fabrication chamber 110, an elevation compensating track driven assembly 106, engine 112, and cabin 113. Cabin 113 contains a computer control operating panel used to maneuver fabricator means 105 and the monorail fabrication process. Fabrication chamber 110 includes material entry end 107, monorail core assembly section 105a, monorail body assembly section 105b, solar collector application section 105c, monorail finishing section 105d. Mobile monorail structure fabricator means 105 is designed for high maneuverability along the right-of-way, thus fabricator means 105 is provided with flexibility joints 105e and elevation compensating track driven assembly 106. The mobility of elevation compensating track driven assembly 106 is achieved by providing legs 106a which compensate, indicated by arrows a4, for ground g elevation variations using elevation adjustment motor 106b and forward motion of tracks 106d, indicated by arrows a3, by using track motor 106c.

Figure 6:
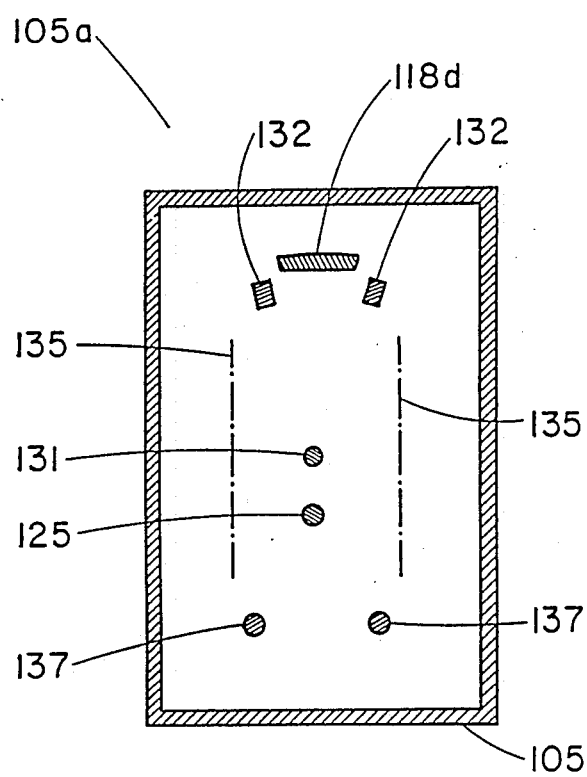
FIG. 6 is a cross sectional view of the mobile monorail structure fabricator means taken along the line 6—6 of FIG. 4 showing the monorail core assembly chamber section.
Figure 7:
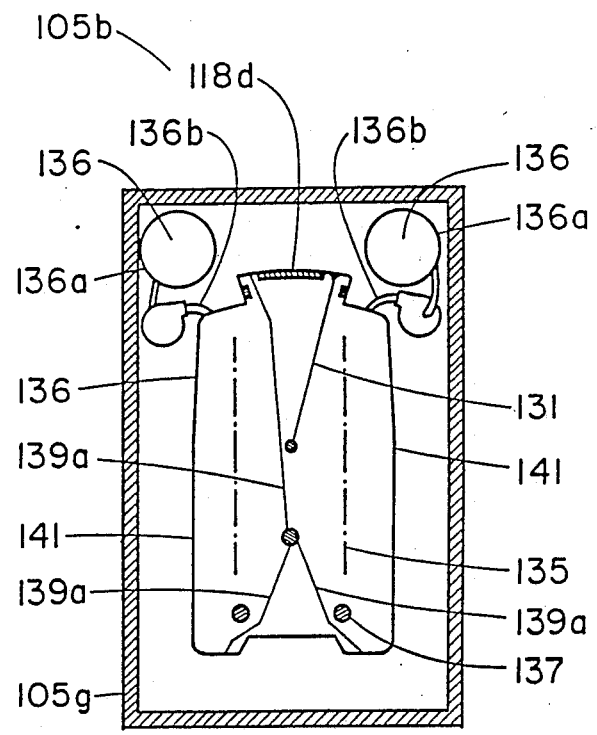
FIG. 7 is a cross sectional view of the mobile monorail structure fabricator means taken along the line 7—7 of FIG. 4 showing the monorail body assembly section.

Material input accommodations, such as power conductors spool 109, aluminum or steel sheet material spool 109a and liquid material delivery hose 107a, needed to construct the monorail 101 is provided at end 107 of fabricator means 107. A pathway 111 allows access to monitor the assembly process. After providing the necessary material at end 107, the monorail construction can begin. As previously stated fabrication chamber 110 includes monorail core assembly section 105a, monorail body assembly section 105b, solar collector application section 105c, monorail finishing section 105d. Referring now to FIG. 6, showing a cross section of monorail core assembly section 105a, having outer wall 105g, wherein is shown various core elements being formed including a positioned power conductor 132, optical conductor 131, tfm secondary 118d, rail reinforcement 135, tensioning cable 137, photovoltaic conductor 125. Once the various core elements are positioned the embodiment process may begin. Referring now to FIG. 7, showing a cross section of monorail body assembly section 105b and showing positioned tfm secondary 118d, rail reinforcement 135, tensioning cable conduit 137 and interconnecting wiring 139a and 131. The core material 136 used to form the monorail core body 101a is in a liquid form and is contained in a reservoir 136a and is injected into a core body form 141 by material injector 136b. The core body is allowed to cure before applying the solar collector 104.

Figure 8:
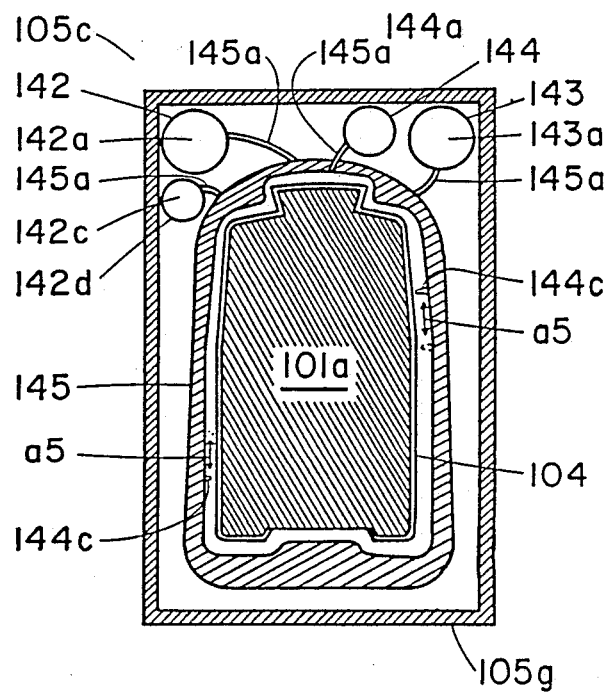
FIG. 8 is a cross sectional view of the mobile monorail structure fabricator means taken along the line 8—8 of FIG. 4 showing the solar collector material application chamber section.
Figure 9:
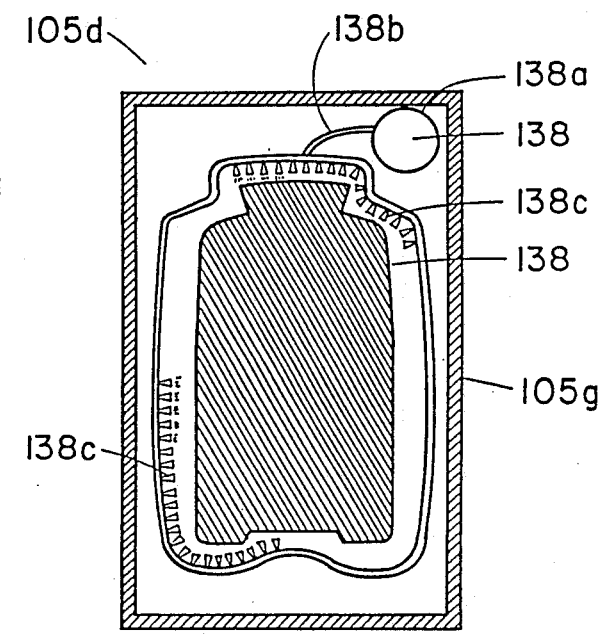
FIG. 9 is a cross sectional view of the mobile monorail structure fabricator means taken along the line 9—9 of FIG. 4 showing the monorail finishing chamber section.

Once the monorail core body is cured the solar collector 104 is ready to be formed. Referring now to FIG. 8 showing a cross section of solar collector formation section 105c. The formation process consists of layering onto inner core 101a silicon materials comprised of inner p-layer material 142a, typically hydrogenated silicon doped with phosphorous, an intrinsic layer 142c, typically undoped hydrogenated silicon, and an outer n-layer 143a, typically hydrogenated silicon doped with boron. The process includes a vacuum deposition chamber means 145 having entry tubes 145a connected to reservoir 142 containing material 142a, reservoir 142d containing material 142c and reservoir 143 containing material 143a. The formation process of solar collector 104 further includes applying a metallic grid conductor material 144a from reservoir 144 via entry tube 145a. The grid conductor material, in emulsion form, is applied using moving applicator 144c, shown in motion by arrow a5. The applied solar collector 104 is allowed to cure before being exposed to the environment. Once cured, the monorail fabrication advances to the finishing section. Referring now to FIG. 9 showing a cross section of monorail finishing section 105d where finishing material 138 contained in reservoir 138a is sprayed onto the monorail using a plurality of spray nozzles 138c supplied from tube 138c.

Figure 10:
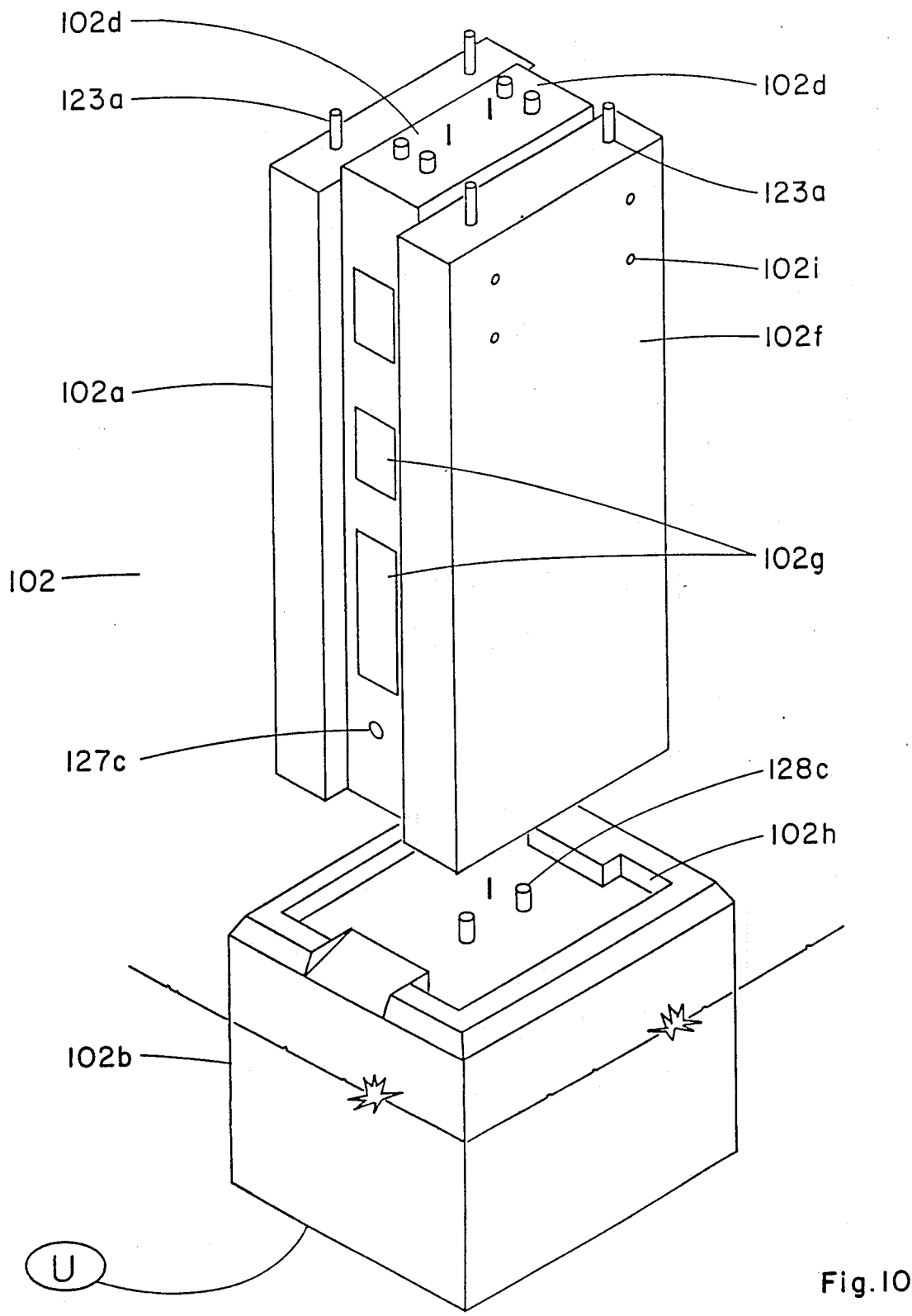
FIG. 10 is a perspective view of a typical monorail support column showing a footing, a post, mounting guides, electrical connections, and optical connections.

FIG. 10 shows a typical support column assembly 102 including support post 102a having sides 102f and post footing 102b. Positioned between sides 102f are the electronic component access panels 102g and electrical outlet 127c. To enable external interface with power utility U, electrical connectors 128c are provided between post 102a and post footing 102b. The assembly of the post 102a to post footing 102b takes place during the finishing stages of the fabrication of monorail 101 at which time the post 102a is lifted using lifting means 102i and then the bottom end of post 102a is inserted into post receiver shoe 102h. Also provided for the mounting of monorail 101 to column 102 are post-monorail structural connectors 123a. The necessary wiring between monorail and post 102a is connected using electrical and optical connector means 102d.

Therefore, while the present invention has been shown and described herein in what is believed to be the most practical and preferred embodiment, it is recognized that departures can be made therefrom within the scope of the invention, which is therefore not to be limited to the details disclosed herein but is to be accorded the full scope of the claims so as to embrace any and all equivalent apparatus.

I claim:

1. A transit vehicle apparatus adapted to be propelled along a solar energy collecting monorail structure, said transit vehicle apparatus comprising:
   (a) a transverse flux motor means for magnetically coupling said monorail structure, drawing electrical energy converted by said monorail structure and producing propulsion and levitation forces, which provide power to said apparatus being propelled along said monorail structure;
   (b) a fiber optical control means for communicating with said solar energy collecting monorail structure;
   (c) a floor member having an omega-shaped bottom portion that conforms to an upper rail portion of said solar energy collecting monorail structure, said transverse flux motor means being housed in said omega-shaped bottom portion; and
   (d) a monorail skid roller means for providing low friction contact between said transit vehicle apparatus and said solar energy collecting monorail structure.

2. A method of propelling a transit vehicle on a solar energy collecting monorail structure, said method comprising the steps of:
   (a) providing a solar energy collecting and conversion monorail structure;
   (b) providing a transit vehicle apparatus, said apparatus comprising:
   transverse flux motor means for magnetically coupling said monorail structure;
   (c) drawing electrical energy from said monorail structure;
   (d) producing levitation of said transit vehicle apparatus; and
   (e) producing propulsion forces, which provide power to said apparatus being propelled along said monorail structure.

3. A transit vehicle apparatus adapted to be propelled along a solar energy collecting monorail structure, said apparatus comprising:
   transverse flux motor means for magnetically coupling said monorail structure, which draws electrical energy converted by said monorail structure and produces propulsion and levitation forces, which provide power to said apparatus being propelled along said monorail structure.

4. A transit vehicle apparatus as recited in claim 3, further comprising:
   fiber optical control means for communicating energy demand ignals with an energy controller member associated with said solar energy collecting monorail structure.

5. A transit vehicle apparatus as recited in claim 3, further comprising:
   a floor member having an omega-shaped bottom portion that conforms to an upper rail portion of said solar energy collecting monorail structure, said transverse flux motor means being housed in said omega-shaped bottom portion; and
   a monorail skid roller means for providing low friction contact between said transit vehicle apparatus and said solar energy collecting monorail structure.

* * * * *